Sept. 1, 1925.
E. F. GOBATTI
INCLINOMETER AND LEVEL
Filed May 20, 1924
1,552,141
3 Sheets-Sheet 1
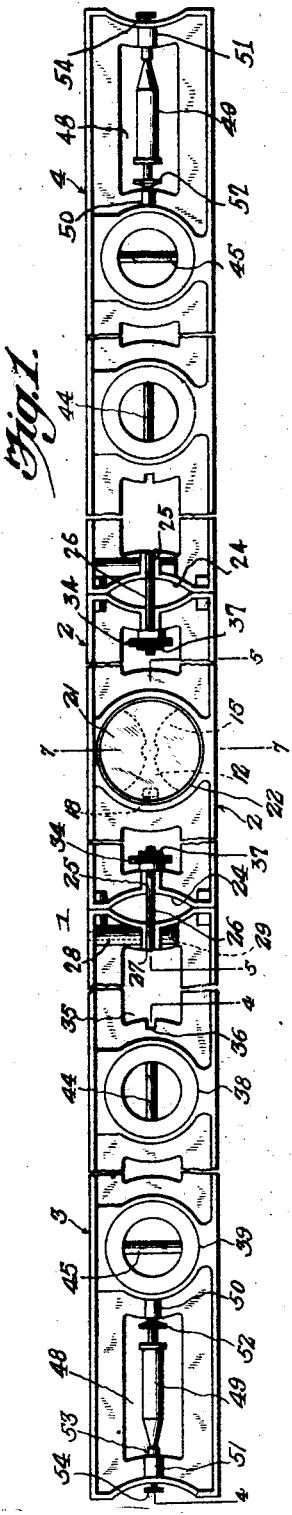
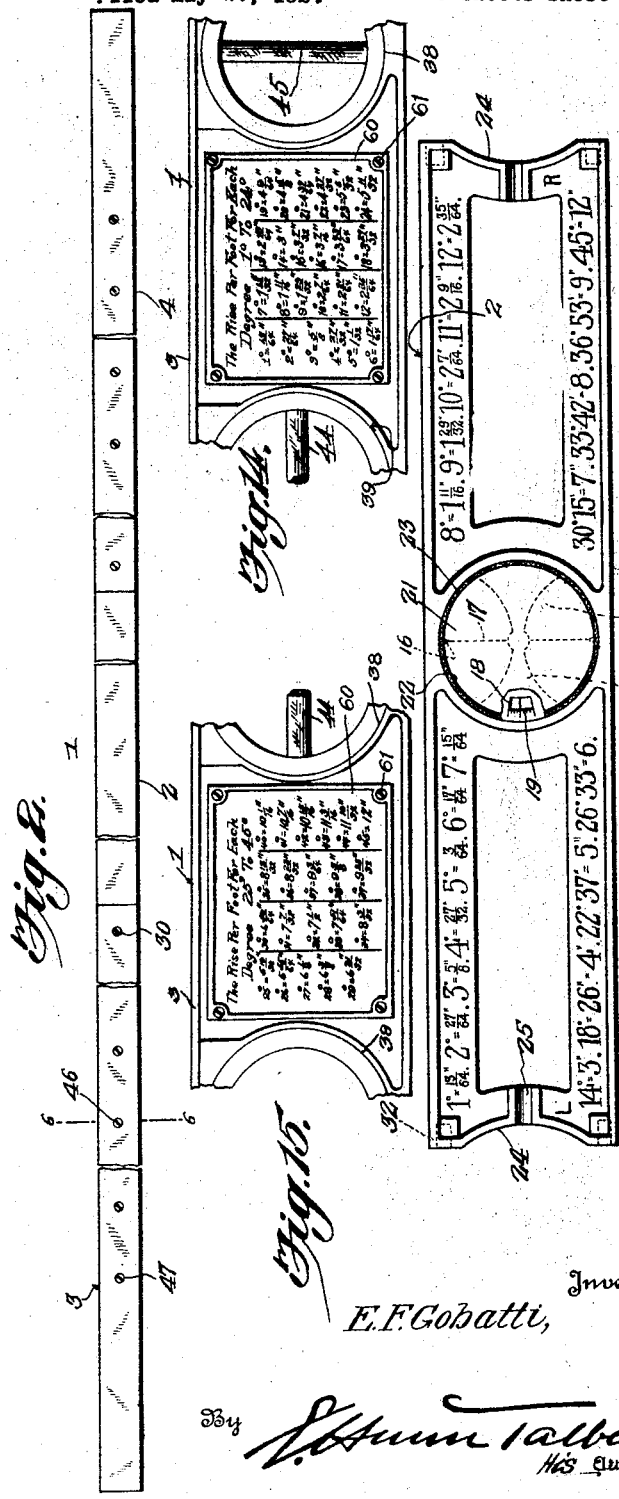
Inventor
E. F. Gobatti, Sept. 1, 1925.
E. F. GOBATTI
1,552,141
INCLINOMETER AND LEVEL
Filed May 20, 1924        3 Sheets-Sheet 2
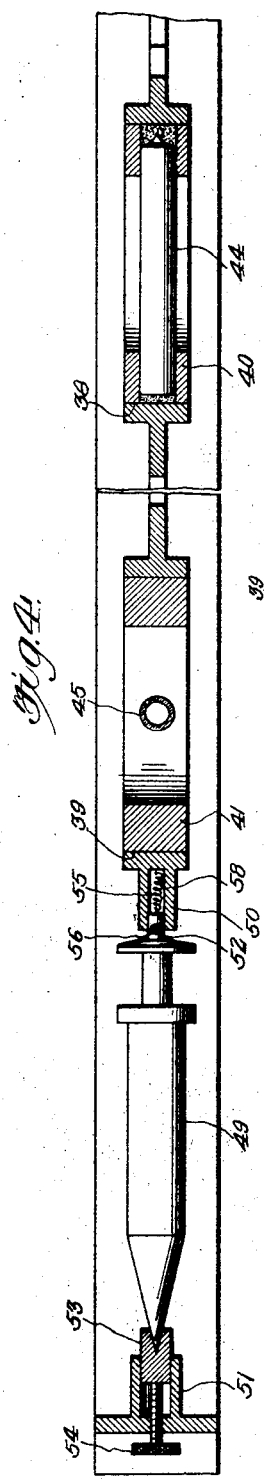
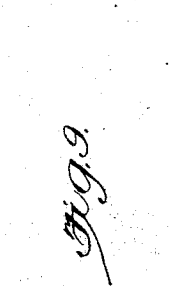
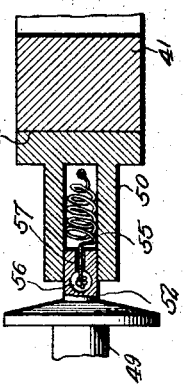
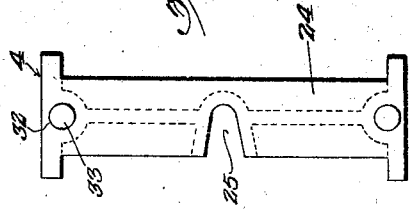
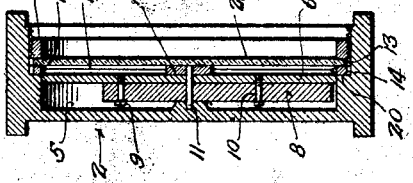
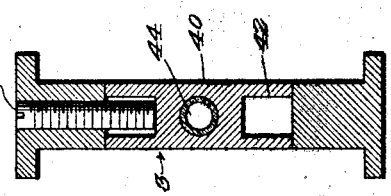
Inventor
E. F. Gobatti,
By
His Attorney.

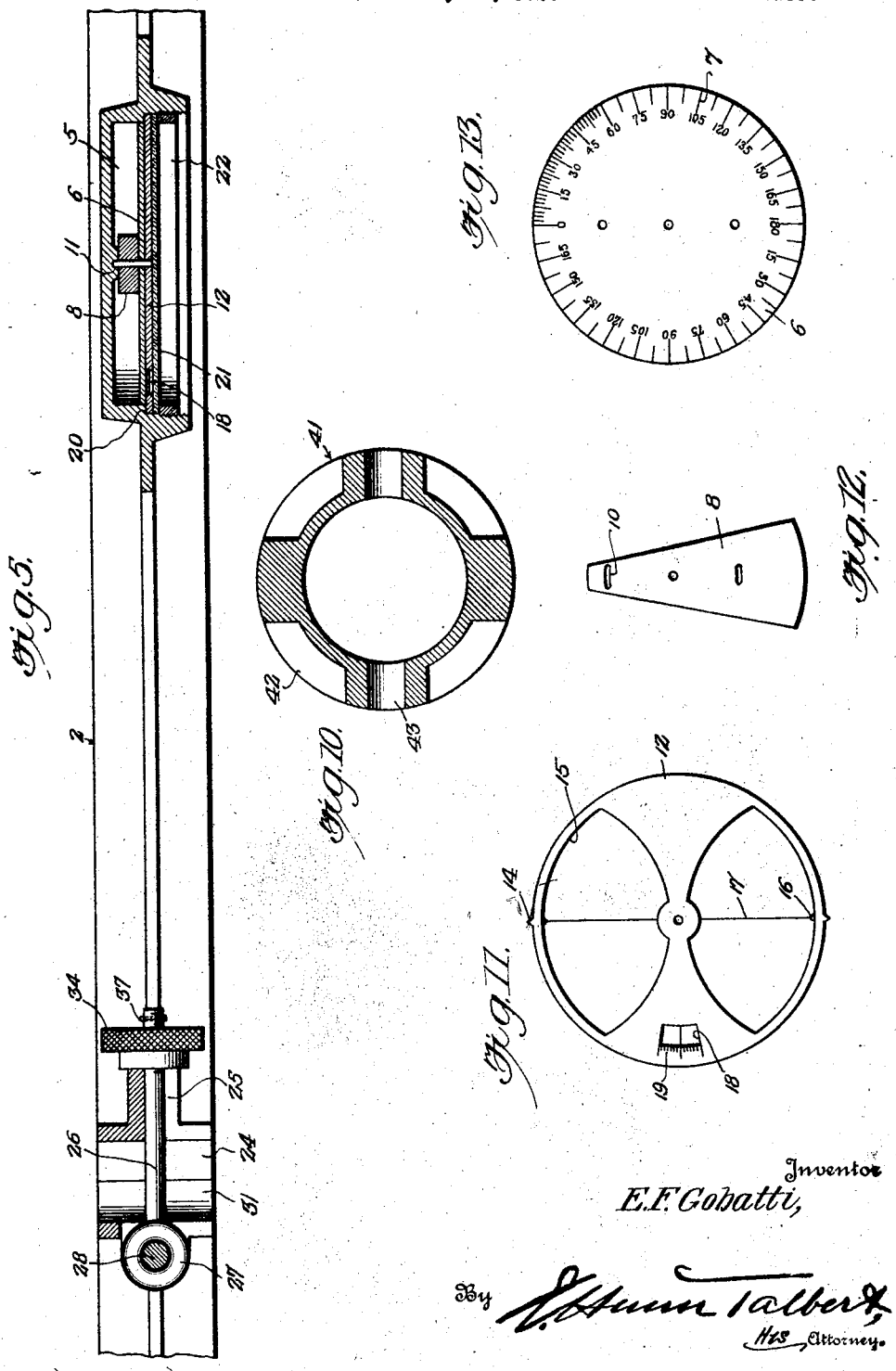

Patented Sept. 1, 1925.

1,552,141

UNITED STATES PATENT OFFICE.

EDMUND F. GOBATTI, OF PUEBLO, COLORADO.

INCLINOMETER AND LEVEL.

Application filed May 20, 1924. Serial No. 714,610.

*To all whom it may concern:*

Be it known that EDMUND F. GOBATTI, a citizen of the United States of America, residing at Pueblo, in the county of Pueblo and State of Colorado, has invented new and useful Improvements in Inclinometers and Levels, of which the following is a specification.

The present invention has for its purpose to provide, in an inclinometer and level, a construction including means for measuring inclines in degrees and minutes and also means for leveling walls constructed of brick or other masonry, and beams, studding and the like.

Another purpose is to provide an instrument of this character provided with means for mounting an inclination measuring device in the body of the instrument, said device comprising a weighted dial graduated in degrees and minute subdivisions, so mounted in the body of the instrument that when the instrument is engaged with a surface exactly level, the cipher at the top of the dial will register with an indicator carried by the body of the instrument, and in case the surface on which the instrument engages is inclined in either direction, the graduations on the dial will cooperate with the indicator, giving the degree of angle. It is obvious that the instrument may be used for ascertaining the inclination of a stud relative to a perpendicular by disposing the instrument adjacent to the stud, in which case the dial will cooperate with another indicator carried by a plate on which the dial is partly supported.

Still another purpose is to provide an inclinometer and level including a body provided with means for supporting two spirit levels, one for leveling horizontal surfaces and the other to plumb an object perpendicularly to a horizontal surface, there being means for retaining the spirit level holding rings in the body of the instrument, whereby the rings may be disposed in different positions. Either of the spirit levels may be used for leveling horizontal surfaces.

A further purpose is the provision of an inclinometer and level comprising a body including a plurality of sections, an intermediate and two end sections, with means for holding the sections in alignment and yet permitting the sections to be separated, whereby they may be arranged in parallelism and adjacent each other in a small compass, whereby the instrument may be shipped in a relatively small box or container. An instrument of this character may be used by machinists, carpenters, bricklayers, masons and for general work, or by civil engineers or by those laying tracks and repairing roads.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a view in elevation of the improved inclinometer and level constructed in accordance with the invention.

Figure 2 is a longitudinal edge view of the same.

Figure 3 is a view in elevation of the intermediate section 2 of the inclinometer.

Figure 4 is a sectional view through one of the end sections of the inclinometer on line 4—4 of Figure 1.

Figure 5 is a sectional view on line 5—5 of Figure 1.

Figure 6 is a sectional view on line 6—6 of Figure 2.

Figure 7 is a sectional view on line 7—7 of Figure 1.

Figure 8 is an end view of the intermediate section of the inclinometer.

Figure 9 is an enlarged sectional view through the parts 41, 50, 52, 55 and 56.

Figure 10 is a detail sectional view of the spirit level holder 41.

Figure 11 is a view in elevation of the web plate 12.

Figure 12 is a detail view of the weight 8.

Figure 13 is a detail view in elevation of the dial 6.

Figure 14 is a view in elevation of a portion of the section 4 of the inclinometer, showing a plate secured by screws thereto, there being one on each side thereof, the plate having engraved thereon the rise per foot for each degree, from one to twenty-four degrees.

Figure 15 is a view in elevation of a portion of one side of the section 3 of the inclinometer with a plate similar to that shown in Figure 14, there being one of said plates on each side of the section, the plate being provided with the rise per foot for each degree, from twenty-five to forty-five degrees.

Referring to the drawings, 1 designates the inclinometer and level as a whole, the same comprising the intermediate section 2 and the two end sections 3 and 4, the former being to the left of the section 2 and the latter to the right of the intermediate section. The several sections may be constructed of any suitable material, preferably aluminum, and are of web construction and the intermediate section in its web is provided with a depressed seat or cavity 5 for the reception of the dial 6 which is provided with graduations 7 in degrees and minutes.

The dial 6 has a weight 8 secured thereto by means of set-screws 9 which engage through slots 10 of the weight and are threaded into the dial 6. This weight extends across the center of the dial which is mounted on a relatively hard polished steel shaft 11 which passes through the dial and weight. In fact, the shaft is mounted upon jeweled bearings, the larger end of the weight depending below the shaft so that, when a surface is exactly level, the cipher at the top of the dial will register with an indicator. The jeweled bearings permit the dial to freely balance in the depressed seat or cavity. The purpose of providing the slots 10 is to permit the weight to be properly adjusted with relation to the dial so that the dial will properly register with the indicator when a surface is exactly level.

One of the jeweled bearings of the shaft is carried by the bottom of the depressed seat or cavity while the other bearing is carried by the center of a web plate 12 which is mounted in the depressed seat or cavity. The cylindrical wall of the depressed seat or cavity at diametrically opposite points has recesses 13 for the reception or ribs or projections 14 at diametrically opposite positions on the web plate 12 which has diametrically opposite enlarged openings 15. The interior of the cylindrical wall of the web plate has radial projections 16 which are connected by a relatively fine wire indicator 17 with which the graduations on the dial cooperate for measuring the angle of an inclination.

The web plate 12 at a position at right angles to the wire indicator is provided with a segmental opening 18, there being adjacent graduations 19 in degrees so that, when the inclinometer is used in a perpendicular position for measuring the tilt of an upright, stud or similar object, the degree graduations on the dial will cooperate with those on the web plate. The web plate is also mounted in the depressed seat or cavity on a shoulder 20 intermediate the bottom of the depressed seat or cavity and the counterbored portion of the cavity. A glass 21 of circular form rests upon the web plate and the dial, together with the web plate and the glass, are retained in the depressed seat or cavity by means of a retaining ring 22 which is threaded into the counterbored portion of the seat or cavity and is knurled, as shown at 23, to permit the ring to be easily screwed home and out of engagement with the wall of the seat.

The opposite end portions of the section 2 of the inclinometer on the web portion thereof is provided with tables of figures showing the rise in 12 inches per single degree up to 12 degrees and in degrees and minutes per even inches from 3 inches up to 12 inches or 45 degrees. In using the instrument when measuring an inclination which causes the dial to register 1 degree, the rise of the angle is 13/64 of an inch per foot and if the inclination covers 2 degrees, the rise of the angle will be 27/64 of an inch per foot and if the inclination covers 18 degrees and 26 minutes the rise of the angle will be 4 inches to the foot and if the dial registers 45 degrees, the rise of the angle will be 12 inches to the foot. All of these tables and others will be found upon the web portion of the section 2 of the instrument, or upon plates 60 secured by screws 61 upon opposite sides of the sections 3 and 4.

The opposite ends of the section 2 of the instrument are provided with arcuate depressions 24, there being lateral recesses 25 for the reception of the shanks of the bolts 26. The bolts have eyes 27 which are pivotally mounted upon pivot shafts 28, certain ends of which are threaded at 29 into cavities of the adjacent ends of the sections 3 and 4 of the instrument. The pivot shafts extend transversely of certain of the recesses 25 formed in the ends of the sections 3 and 4. The adjacent ends of the sections 3 and 4 have arcuate depressions 31 similar to the depressions 24 and adjacent the depressions 24 and 31, the adjacent ends of the sections 2, 3 and 4 are provided with cavities 32 for the reception of dowel pins 33 which hold the sections 2, 3 and 4 in alignment. Thumb nuts 34 are threaded upon the bolts 26 and bear upon the end edges of the walls of the recesses 25, that is, when the bolts 26 are engaged with the recesses 25 and extend transversely of the arcuate depressions 24 and 31, thereby retaining the sections 2, 3 and 4 connected and insuring rigidity. The dowel pins prevent turning of one section relative to the others.

It will be noted that the end portions of the sections 3 and 4 of the instrument have openings 35, the end walls of which have recesses 36 which receive the ends of the bolts 26, that is, when they are disengaged from the recesses 25 and are moved as extending longitudinally of the openings 35. When the bolts are so disposed, the thumb nuts 34 are reversed until they engage the end walls which have the openings 36, thereby retaining the bolts against displacement, avoiding rattling thereof. Furthermore, when the bolts are so disposed, the several sections 2, 3 and 4 may be arranged parallel and adjacent each other in a small compass, permitting them to be disposed in a box or other container when not in use or during transportation. The terminals of the bolts 26 have transverse pins 37 which prevent the thumb nuts from entirely disengaging from the bolts, thereby avoiding loss thereof.

Each of the sections 3 and 4 has circular openings 38 and 39 for the reception of spirit level holders 40 and 41. The holders 40 and 41 are of ring form and have radial webs 42 through which diametrically opposite cylindrical openings 43 are formed. These openings receive spirit levels 44 and 45, the former being used for leveling horizontal surfaces while the latter is used for disposing uprights, studs and the like perpendicularly. Suitable set-screws 46 and 47 are threaded through the bodies of the sections 3 and 4 and engage with the radial webs 42 for the purpose of retaining the spirit level holders in position. Obviously, the positions of the spirit level holders may be changed. In other words, the holder carrying the level 44 may be disposed to position the level 44 for disposing studs and uprights perpendicularly while the other holder may be changed so that the spirit level 45 may be used for leveling horizontal surfaces.

The remote ends of the section 3 and 4 of the inclinometer and level have openings 48 and disposed therein are plumb bobs 49. The opposite ends of the openings 48 have sockets 50 and 51, the former receiving plumb bob retainers 52 while the latter receive dowel members 53, there being set-screws 54 threaded in the remote ends of the sections 3 and 4 for bearing against the dowel members for the purpose of retaining the plumb bobs in position. The retainers 52 have depressions 55 in their heads for the reduced ends of the plumb bobs which have transverse openings 56 and axial passages or openings 57 merging into the openings 56. Wires or cords 58 pass through the openings or passages 57 and are knotted, as shown, the knots being located in the openings 56. The cords pass through the shanks of the retainers and are knotted at their opposite ends as shown. Obviously, when unscrewing the set-screws and thereby loosening the dowel members below the stock of the sections 3 and 4, so that the pointed ends of the plumb bobs are free to move, the plumb bobs may be employed for plumbing an object, especially when the inclinometer and level is disposed in a perpendicular position.

The invention having been set forth, what is claimed is:

1. In an inclinometer and level, an instrument body having a cavity, a pendulum dial mounted therein and provided with graduations in degrees and minutes thereof, an indicator with which the graduations in degrees cooperate for measuring an inclination, means including a plate and jeweled bearings for mounting the dial in the cavity, said plate having an indicator opening, and adjacent graduations in positions at right angles to the indicator for measuring the tilt of a standard.

2. In an inclinometer and level, a body provided with a cavity, a dial located in said cavity for free rocking movements and provided with graduations in degrees and minutes thereof, an indicator with which the graduations cooperate for measuring an inclination, a pendulum weight for the dial including means for adjusting the weight relative to the dial to insure that the graduations accurately register with the indicator when measuring a level surface, means including a plate and jeweled bearings for mounting the dial in the cavity, said plate having an indicator opening, and adjacent graduations in positions at right angles to the indicator for measuring the tilt of a standard.

3. In an inclinometer and level, an instrument body having a cavity, a pendulum dial mounted therein and provided with graduations in degrees and minutes thereof, an indicator with which the graduations in degrees cooperate for measuring an inclination, means including a plate and jeweled bearings for mounting the dial in the cavity, said plate having an indicator opening, and adjacent graduations in positions at right angles to the indicator for measuring the tilt of a standard, the body of the instrument upon opposite portions thereof having tables giving the measurements of inclinations according to the angle thereof.

4. In an inclinometer and level, a body provided with a cavity, a dial located in said cavity for free rocking movements and provided with graduations in degrees and minutes thereof, an indicator with which the graduations cooperate for measuring an inclination, a pendulum weight for the dial including means for adjusting the weight relative to the dial to insure that the graduations accurately register with the indicator when measuring a level surface, means including a plate and jeweled bearings for mounting the dial in the cavity, said plate having an indicator opening, and adjacent graduations in positions at right angles to the indicator for measuring the tilt of a standard, the body of the instrument upon opposite portions thereof having tables giving the measurements of inclinations according to the angle thereof.

5. In an inclinometer and level, the combination with an instrument body provided with a circular depression, of a dial provided with graduations in degrees and minutes thereof in said depression, a pendulum member on the dial, a web plate including jeweled bearings for mounting the dial, one bearing being carried by the bottom of the depression, the other carried by the web plate, an indicator carried by the web plate with which the graduations of the dial cooperate for measuring the angle of an inclination, said web plate having an indicator opening at a location at right angles to the indicator with graduations whereby the body may be disposed perpendicularly for measuring the tilt of an upright, a glass covering the web plate, and means for retaining the glass, web plate and dial in said depression.

6. In an inclinometer and level, the combination with an instrument body provided with a circular depression, of a dial provided with graduations in degrees and minutes thereof in said depression, a pendulum member on the dial, a web plate including jeweled bearings for mounting the dial, one bearing being carried by the bottom of the depression, the other carried by the web plate, an indicator carried by the web plate with which the graduations of the dial cooperate for measuring the angle of an inclination, said web plate having an indicator opening at a location at right angles to the indicator with graduations whereby the body may be disposed perpendicularly for measuring the tilt of an upright, a glass covering the web plate, and means for retaining the glass, web plate and dial in said depression, the body of the instrument upon opposite portions thereof having tables giving the measurements in inches according to the angle thereof.

7. In an inclinometer and level, an instrument body composed of complemental intermediate and end sections arranged end to end in alignment, means for separably coupling the adjacent ends of the sections whereby, upon disconnecting the ends, the sections may be disposed parallel and adjacent each other in a small compass, said coupling means comprising pivots, the adjacent ends of the sections having recesses, bolts engaging said recesses and provided with eyes at certain of their ends and through which the pivots pass, thumb nuts on the bolts for retaining the sections coupled, means for preventing twisting action of one section relative to the other, and means for retaining the bolts in collapsed positions within the end sections and preventing them from rattling when the sections are arranged adjacent and parallel with each other.

In testimony whereof he affixes his signature.

EDMUND F. GOBATTI.